(12) United States Patent
Donhauser et al.

(10) Patent No.: US 9,197,554 B2
(45) Date of Patent: *Nov. 24, 2015

(54) ROUTING AND FORWARDING OF PACKETS OVER A NON-PERSISTENT COMMUNICATION LINK

(71) Applicant: The Boeing Company, Chicago, IL (US)

(72) Inventors: John C. Donhauser, Federal Way, WA (US); Paul R. Norris, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/939,891

(22) Filed: Jul. 11, 2013

(65) Prior Publication Data

US 2013/0301647 A1 Nov. 14, 2013

Related U.S. Application Data

(63) Continuation of application No. 11/941,917, filed on Nov. 16, 2007, now Pat. No. 8,514,698.

(60) Provisional application No. 60/860,303, filed on Nov. 21, 2006.

(51) Int. Cl.
| | | |
|---|---|---|
| *H04L 12/773* | (2013.01) | |
| *H04L 12/947* | (2013.01) | |
| *H04L 12/823* | (2013.01) | |
| *H04L 12/741* | (2013.01) | |
| *H04W 40/04* | (2009.01) | |
| *H04W 40/20* | (2009.01) | |

(52) U.S. Cl.
CPC ............. *H04L 45/60* (2013.01); *H04L 45/54* (2013.01); *H04L 47/32* (2013.01); *H04L 49/252* (2013.01); *H04W 40/04* (2013.01); *H04W 40/20* (2013.01)

(58) Field of Classification Search
None
See application file for complete search history.

(56) References Cited

U.S. PATENT DOCUMENTS

| | | | | |
|---|---|---|---|---|
| 5,889,906 | A  * | 3/1999 | Chen | 385/28 |
| 2002/0122394 | A1 * | 9/2002 | Whitmore et al. | 370/328 |
| 2003/0115480 | A1 * | 6/2003 | McDysan | 713/201 |
| 2004/0078799 | A1 * | 4/2004 | Koning et al. | 719/313 |
| 2005/0074019 | A1 * | 4/2005 | Handforth et al. | 370/406 |
| 2005/0163079 | A1 * | 7/2005 | Taniuchi et al. | 370/331 |
| 2006/0203804 | A1 * | 9/2006 | Whitmore et al. | 370/352 |

* cited by examiner

*Primary Examiner* — Ashley Shivers
(74) *Attorney, Agent, or Firm* — Hugh P. Gortler

(57) ABSTRACT

An apparatus includes a table including Internet protocol (IP) addresses and corresponding ports, which specify physical and logical a logical links; and a router module for receiving IP packets and using the table to associate the IP packets with the ports without differentiating between ports specifying physical links and ports specifying logical non-persistent links. The apparatus further includes a driver for determining when assets for a logical link have become available, refraining from forwarding associated IP packets to the assets if the assets are not available, and then forwarding the associated IP packets to the assets once the assets have become available.

12 Claims, 4 Drawing Sheets

ROUTING AND FORWARDING OF PACKETS OVER A NON-PERSISTENT COMMUNICATION LINK

This is a continuation of U.S. Ser. No. 11/941,917 filed 16 Nov. 2007, now U.S. Pat. No. 8,514,698. U.S. Ser. No. 11/941,917 claims the benefit of provisional application 60/860,303 filed 21 Nov. 2006, which is incorporated herein by reference.

BACKGROUND

A typical router receives an Internet Protocol (IP) packet, uses a router table to look up a port corresponding to a router interface, and immediately forwards the IP packet to that router interface. In a network having a fixed infrastructure, the router interface sends the IP packet along a persistent communication link to a network destination.

Not all networks have a fixed infrastructure. A wireless ad-hoc network is a computer network in which the communication links are wireless and dynamic. The network is ad hoc because the nodes dynamically join and leave the network, and so the determination of which nodes forward data is made dynamically based on network connectivity. Types of wireless ad-hoc networks include Mobile ad hoc networks (MANets) and wireless mesh networks.

SUMMARY

According to an embodiment herein, an apparatus comprises a table including Internet protocol (IP) addresses and corresponding ports, the ports specifying physical and logical links; and a router module for receiving IP packets and using the table to associate the IP packets with the ports without differentiating between ports specifying physical links and ports specifying logical non-persistent links. The apparatus further comprises a driver for determining when assets for a logical link have become available, refraining from forwarding associated IP packets to the assets if the assets are not available, and then forwarding the associated IP packets to the assets once the assets have become available.

According to another embodiment, a terminal comprises router interface assets; a router module for receiving incoming Internet protocol (IP) packets and routing the incoming IP packets to a port associated with a logical link; and a driver for the logical link. The driver determines which assets have become available, and forwards the IP packets to the available assets.

According to yet another embodiment, a method comprises using a driver in a routing machine to refrain from forwarding a received Internet protocol (IP) packet to a port when assets for a logical link identified by the port are unavailable; and forward the IP packet to the port when the assets for the logical link have become available.

One or more embodiments address a problem of routing IP packets across a network where the communication links are non-persistent. In addition, they allow for a commercial router to be used instead of a custom designed router. Algorithms and interfaces for the assets can be embedded in the driver.

DETAILED DESCRIPTION

Figure 1:
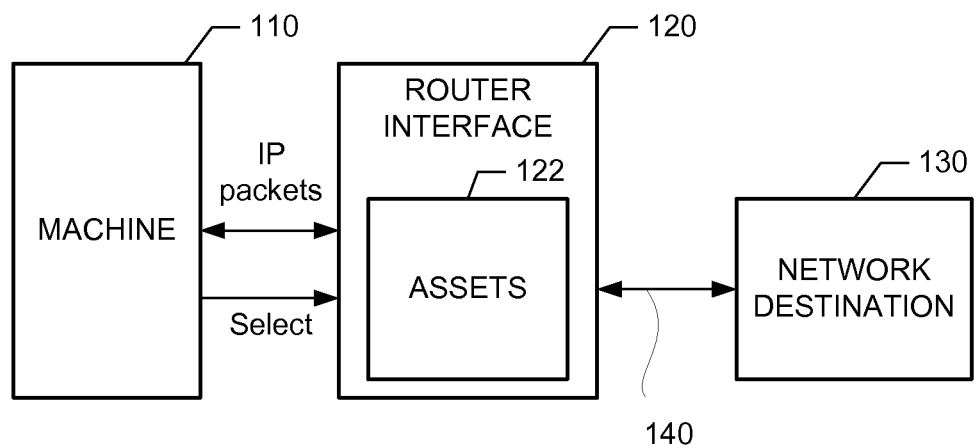
FIG. 1 is an illustration of a system in accordance with an embodiment of the present invention.

Reference is made to FIG. 1, which illustrates a machine 110 that communicates with a router interface 120 by sending and receiving message packets according to the well-known Internet protocol (IP). According to this protocol, the machine 110 receives IP packets from the router interface 120, and routes the incoming IP packets based on the packets' IP addresses.

The machine 110 forwards IP packets to the router interface 120. The router interface 120 includes assets 122, which send IP packets to network destinations 130. A network destination 130 may be a simple IP device (e.g., a webcam, a personal computer), another router, or any other IP device that can communicate over an IP network.

The router interface 120 sends IP packets to network destinations via one or more communication links. A communication link refers to that portion between the router interface 120 and a network destination 130. The communication links in FIG. 1 are represented by the double-arrowed line 140.

The router interface 120 includes pools of assets 122. Assets 122 refer to the hardware that sends packets out of the machine 110. The machine 110 selects certain assets 122 and configures the selected assets 122 to send IP packets to network destinations over communication links 140.

Some assets 122 send IP packets to network destinations 130 over communication links that are non-persistent. Non-persistent communications links are referred to as "logical links." Examples of assets for logical links include time, antennas, modems, and up-down converters. Attributes of a logical link may include specific time slots and specific antennas. Other examples of attributes include, without limitation, data rate, type of RF modulation, and center RF frequency (which are set in a modem), power level (which is set in an up/down converter), the number of time slots that can be used for a logical link, those time slots that are used to transmit IP packets and those that are used to receive IP packets.

Other assets 122 send IP packets to network destinations 130 over communication links 140 that are persistent. Persistent communication links are referred to as physical links. Assets for physical links include, for example, an Ethernet chip set.

Logical links are dynamic. A logical link might vary temporally. For example, time slot assignments are a critical part of Time Division Multiple Access (TDMA)-based communications networks because each node is assigned time slots in which it can transmit or receive packets. In modern wireless networks, the TDMA time slots are assigned to each node. The time slots can vary dynamically. Consequently, an asset such as a time might not be available until the slots are assigned.

A logical link might vary spatially. Consider directional antenna hardware on a mobile platform. The directional antenna hardware includes multiple antennas, up-down converters, transceivers, etc. Since the location and orientation of the platform can vary dynamically, assets such as antennas aren't selected until the location and orientation of the platform has been determined.

The machine 110 takes these dynamics into account. The machine 110 receives IP packets, and immediately routes the packets. However, the machine 110 does not forward IP packets to the router interface 120 until it determines that assets have become available to support a logical link with a network destination. In this manner, the machine 110 refrains from forwarding IP packets when assets for a logical link identified by the port are unavailable. Once the assets have become available (e.g., once the assets have been selected), the machine 110 forwards IP packets to the selected assets 122. The selected assets 122 then send the IP packets via a logical link to a network destination 130.

Figure 2:
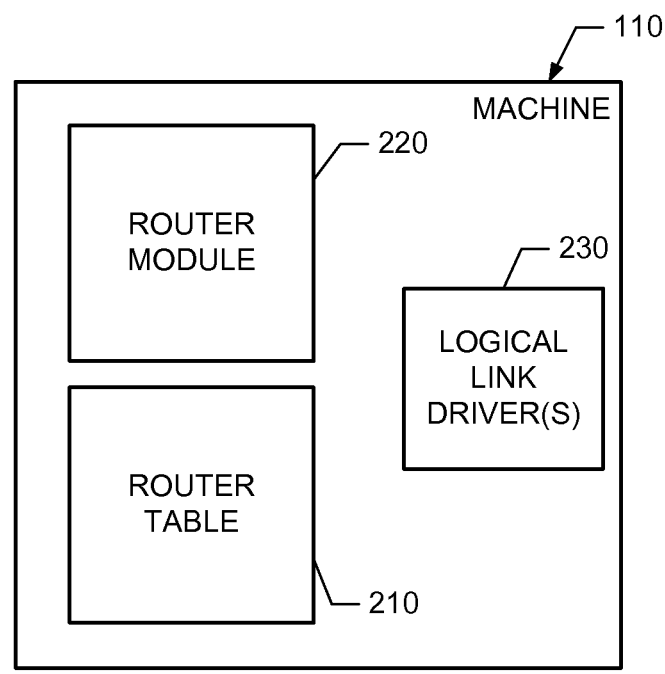
FIG. 2 is an illustration of a machine in accordance with an embodiment of the present invention.

Reference is made to FIG. 2, which illustrates an exemplary machine 110. As used herein, the term exemplary indicates an example and not necessarily an ideal. The machine 110 includes a router table 210. The router table 210 includes a plurality of entries, each entry containing an IP address and a corresponding port. Each port specifies a communication link. A physical port specifies a physical link, and a logical link port specifies a logical link.

Figure 3:
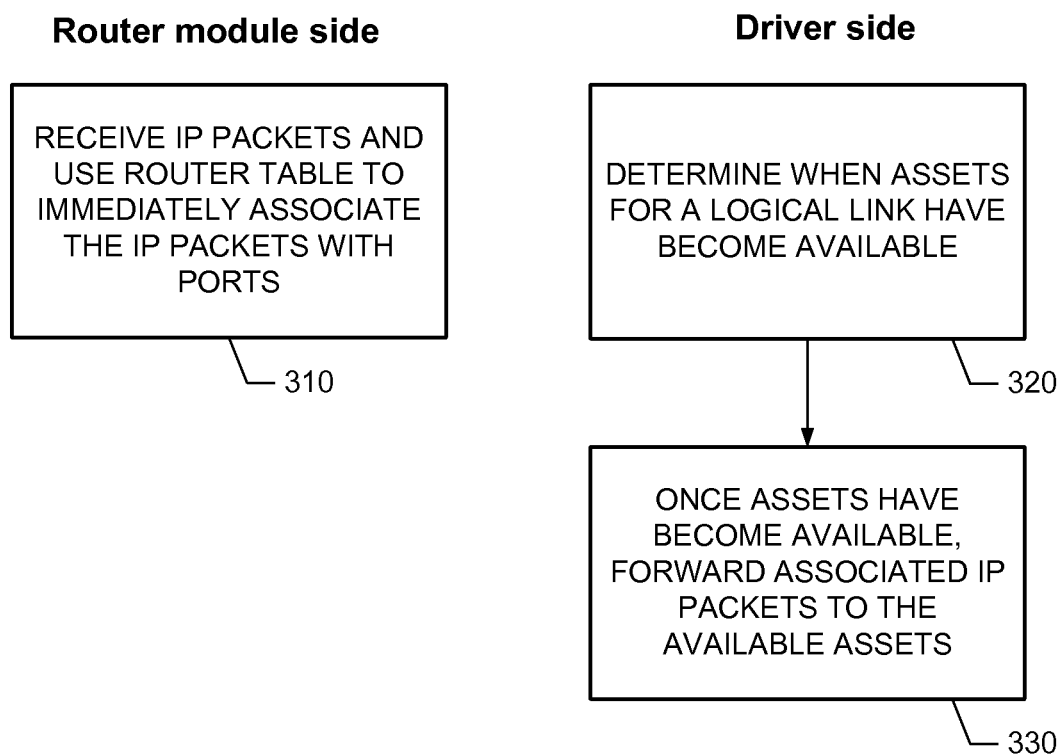
FIG. 3 is an illustration of a method in accordance with an embodiment of the present invention.

Additional reference is made to FIG. 3. When a packet is received by the machine 110, the packet may be stored in a reserved memory location. A router function is called, whereby a router module 220 uses the router table 210 to immediately associate the IP packets with ports (block 310). The router module 220 may look up a port in the router table 210 based on the packet's IP address.

The router module 220 may create a pointer to the memory location where the packet is stored. The packet pointer is then passed to a driver associated with the port. The router module 220 also populates the router table 210 with ports. Such routing may be performed in a conventional manner. The router module 220 may be implemented either in hardware or software. Commercial off-the-shelf router hardware or software (or both) may be used.

The machine 110 further includes at least one logical link driver 230. A logical link driver 230 determines when assets for its logical link have become available (block 320). This function may include selecting certain assets for the logical link, and configuring the selected assets to send framed packets via the logical link. A logical link driver 230 may also maintain the attributes of the assets for its logical link.

Once assets have become available, the driver 230 forwards associated IP packets to the available assets (block 330). The available assets then send framed packets over the logical link.

Thus, the machine 110 addresses a problem of routing IP packets across a network where the communication links are non-persistent. Moreover, the router module 220 does not need to know the difference between conventional physical link drivers and logical link drivers 230. The router module 230 simply maps ports to IP addresses. To the router module 220, a logical link driver is just another driver. This allows the router module 220 to be a commercial router instead of a custom designed router. In addition, the router module 220 can be upgraded without having to redesign the drivers. And since the router module 220 doesn't have to differentiate between ports for physical links and ports for logical links, the algorithms and interfaces for the assets can be embedded in the logical link driver 230. This may include algorithms and interfaces that operate in the time/space/frequency/multi-antenna domain.

The machine 110 is not limited to any particular type or use. The machine 110 may be a standalone unit or it may be integrated in a larger system. Examples include, without limitation, routers and terminals.

Figure 4:
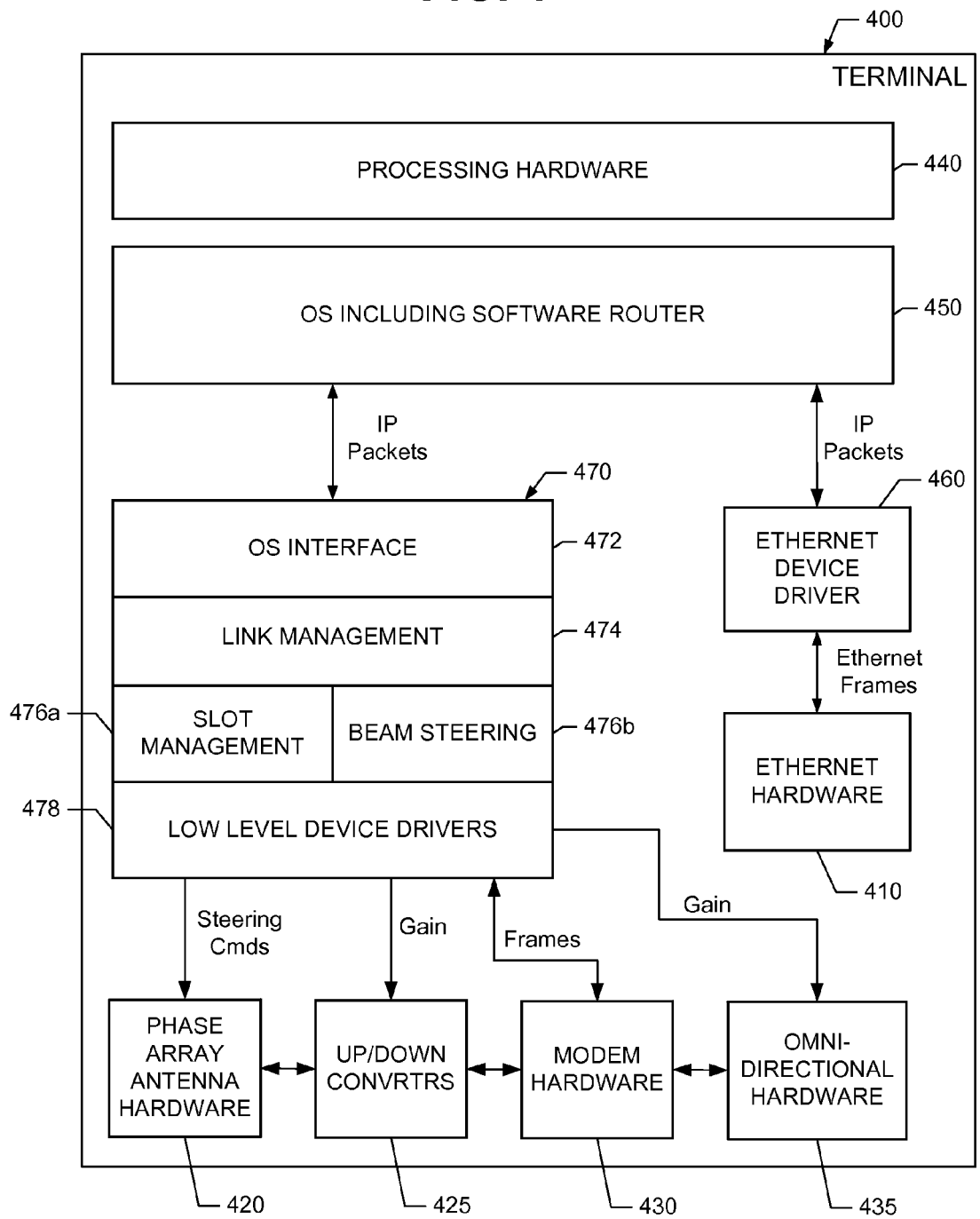
FIG. 4 is an illustration of a terminal in accordance with an embodiment of the present invention.

Reference is made to FIG. 4, which illustrates an exemplary terminal 400. The terminal 400 includes a router interface. Assets for physical links include Ethernet hardware 410. For example, the Ethernet hardware 410 might include chipsets for a 100 Mb Ethernet and two Gigabit Ethernets. The Ethernet hardware 410 is part of a fixed infrastructure that, for instance, allows the terminal 400 to connect to a laptop computer, a GPS device, an inertial navigation system, a web camera, a fixed router acting as a gateway to another network, or some other network device.

Assets for logical links may include time and antenna terminal units (ATUs). An ATU includes a phased array antenna 420, up/down converter 425, omni-directional antenna 435, and modem 430. A phased array antenna 420 includes an antenna aperture and a beam steering controller.

For directional communication, a selected modem 430 transmits and receives radio frames and exchanges a modulated radio signal (e.g., a 5 GHz signal) with a selected up/down converter 425. The selected up/down converter 425 exchanges a modulated radio signal (e.g., a 15 GHz signal) with a selected phased antenna array 420. The selected phased array antenna 420 is controlled in response to gain and steering commands.

For omni-directional communication, a selected modem 430 receives radio frames and exchanges a modulated radio signal with an omni-directional antenna 435. The omni-directional antenna 435 also receives gain commands.

The terminal 400 includes processing hardware 440 (e.g., an embedded computer including a CPU and system memory) that runs an operating system (OS) 450. The operating system 450 may include a protocol stack such as a transmission control protocol/Internet protocol (TCP/IP) stack (or the operating system may run a different protocol stack). The operating system 450 may include a software router. In the alternative, a software router may be an application that runs on the operating system 450.

Additional applications that run on the operating system 450 include physical link drivers and logical link drivers. The physical link drivers may include an Ethernet device driver 460, which provides Ethernet frames to the Ethernet hardware 410. The logical link drivers include a radio frequency (RF) driver 470 for providing frames to the modem hardware 430, gain commands to the up/down converters 425, steering commands to the phased array antenna hardware 420, and gain commands to the omni-directional hardware 440.

The RF driver 470 includes an OS interface 472 for receiving IP packets from, and sending IP packets to, the operating system 450. The RF driver 470 may be a layer-2 function and a layer-1 control function in the OSI model. Accordingly, a driver instance exchanges IP packets with an OSI Layer-3 IP Stack.

The RF driver 470 further includes link management 474 for encapsulating the IP packets with the RF driver's unique link layer information to produce link layer frames. This unique information might include position (latitude, longitude and altitude) which a peer terminal will use along with its attitude to steer a phased array antenna beam towards the terminal 400. The link management 474 may also save the peer terminal's position information.

The RF driver 470 further includes slot management 476a, beam steering 476b, and low level device drivers 478. The slot management 476a assigns time slots to the logical links. The beam steering 476b determines the location of peer terminals to make a just-in-time decision in selecting an antenna from the antenna hardware 420, and it computes a pointing vector from the face of the selected antenna.

The low level device drivers 478 formulate commands and send the commands to the selected assets. In addition, a low level serial bus (e.g., RS422) driver may be used to communicate with an Inertial Navigation System, and a bus (e.g., PCI) driver may be used to talk to the timing card that gives us an interrupt when at the edge of a time slot.

The router interface may be expanded simply by adding a link (e.g., a new I/O device) and installing the appropriate driver. No additional changes are needed for routing the IP packets.

The terminal 400 may be used in any IP network, including a wireless "hub and spoke" network. However, the terminal 400 is especially suitable for an ad hoc mobile IP network of terminals, where the terminal 400 functions as a mobile router. This type of network does not have a fixed infrastructure of IP routers. The mobile routers come and go and are constantly changing position. For instance, a terminal 400 may be carried by a land vehicle, aircraft or other mobile platform.

The terminal may be a part of a DNW, which is an ad hoc network of terminals that use TDMA communication. The DNW has the topology of a mesh network, where terminals 400 are interconnected via logical links.

A DNW terminal may have the following modes of operation: TDMA communication with an omni-directional antenna, and TDMA communication with a directional antenna. A directional antenna can provide additional gain for increased performance on transmit and receive and reduced interference from unwanted sources. The RF driver 470 constructs a DNW waveform in conjunction with the selected assets. The directional antenna just adds a layer of complexity to the RF driver 470. Not only does the RF driver 470 deal with time slot coordination, but it also deals with the location of the peer terminals and the location and attitude of its own terminal to make a just-in-time decision in selecting assets.

Figure 5:
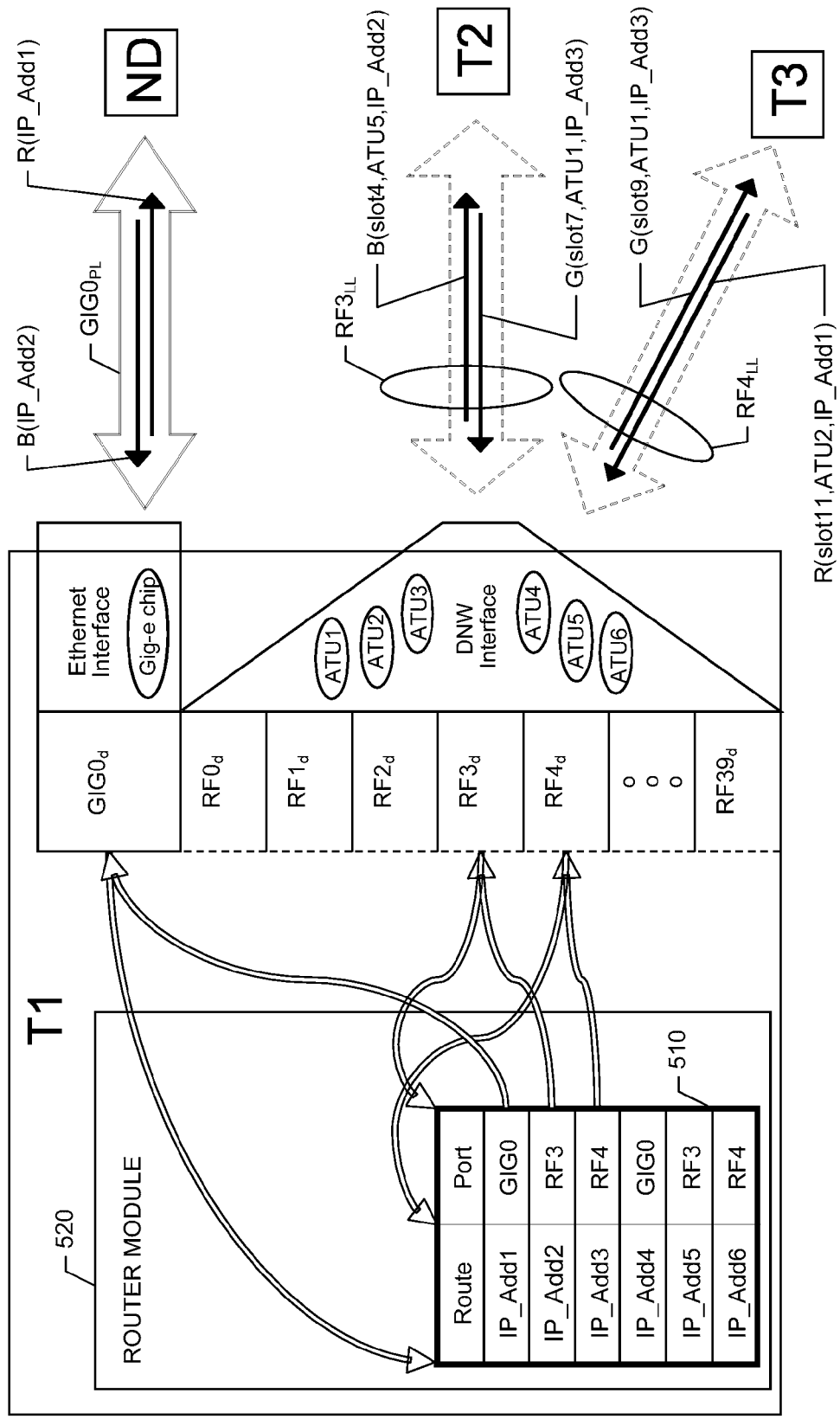
FIG. 5 is an illustration of runtime operation of a Directional Network Waveform (DNW) terminal in accordance with an embodiment of the present invention.

Reference is now made to FIG. 5, which illustrates runtime operation of DNW terminals T1, T2 and T3. Within each terminal, each driver can have one or more instantiations in order to service multiple ports of the same device type. For example, a single instance of a Gigabit Ethernet driver and a pool of RF driver instances can be created for each terminal. The first terminal T1 illustrates the availability of one gigabit Ethernet port (GIG0) and ports for forty logical links (RF0 through RF39), where more than one of those logical links could be active simultaneously.

In the examples that follow, the following notation will be used. Subscript d following a port refers to a driver instance corresponding to that port, subscript LL following a port refers to a logical link corresponding to that port, and subscript PL following a port refers to a physical link corresponding to that port. An arrow pointing toward the terminal T1 indicates a received packet, and an arrow pointing away from the terminal T1 indicates a transmitted packet.

Logical links RF$3_{LL}$ and RF$4_{LL}$ are established between terminal T1 and its peer terminals T2 and T3. As these logical links RF$3_{LL}$ and RF$4_{LL}$ are established, IP addresses of the network devices connected to the peer terminals T2 and T3 are added to terminal T1's router table 510 along with associated ports. In this manner, the router table 510 is populated. The ports in the router table 510 of FIG. 5 show three active communication links GIG$0_{PL}$, RF$3_{LL}$ and RF$4_{LL}$ at ports GIG0, RF3 and RF4. The other thirty eight logical links are idle and will remain so until such time as logical links are desired with additional terminals, at which time, time-slots will be assigned to those logical links.

Time might be the first asset that becomes available. For example, time becomes available when a time slot associated with a logical link arrives. The remaining assets of the DNW interface (e.g., an ATU) are then dynamically selected by an RF driver instance. After the assets have been selected, the logical link driver instance generates gain and beam steering commands, and outputs link layer frames to the selected ATU.

Consider the following additional examples. Packet B with destination address IP_Add2 is received on the Gigabit Ethernet and routed to port RF3, which specifies an instance RF$3_d$ of the RF driver. Once assets become available, the RF driver instance RF$3_d$ forwards packet B to terminal T2 in time slot 4 over logical link RF$3_{LL}$ using antenna terminal unit ATU5.

A packet G with destination address IP_Add3 is received by terminal T1 over logical link RF$3_{LL}$ in time slot 7 using antenna terminal unit ATU1. RF driver instance RF$3_d$ receives packet G and sends it to the router module 520, where it is routed to driver instance RF$4_d$. Once assets become available, driver instance RF$4_d$ forwards packet G in time slot 9 to terminal T3 using antenna terminal unit ATU1.

A packet R with destination address IP_Add1 is received over logical link RF$4_{LL}$ in time slot 11 using antenna terminal unit ATU2. RF driver instance RF$4_d$ receives packet G and sends it to the router module 520, where it is routed to driver instance GIG$0_d$. Driver instance GIG0 forwards packet R to network device ND over a physical link GIG$0_{PL}$.

Since the position of either or both terminals in a logical link might change (due, for instance, to being on mobile platforms), neither terminal knows which assets to use at the time the packets are routed. The sending terminal only knows where the IP packets should go logically.

Consider the following example. Terminal T1 has established logical links with peer terminals T2 and T3. Initially, from the perspective of terminal T1, the peer terminals T2 and T3 have a large angle separating them, so time-slot 4 is assigned to both logical links RF$3_{LL}$ and RF$4_{LL}$. Communication from terminal T1 to peer terminal T2 is performed with antenna unit ATU1, and communication to peer terminal T3 is performed using antenna unit ATU4 because those antenna units have peer terminals T2 and T3 in their field of view. Now suppose terminals T2 and T3 suddenly move very close together, such that they are both in the field of view of terminal T1. Only antenna unit ATU1 has both terminals T2 and T3 in its field of view. Therefore, either terminal T2 or terminal T3 will get starved out for lack of assets. Consequently, one terminal T2 or T3 will get some packets in slot 4, and the other terminal will get nothing. Packets that have been routed to the "starved" terminal won't get lost. They will stay "queued" by the RF driver instance RF$3_d$ or RF$4_d$ until another time slot assigned to the associated logical link arrives, and a "free" ATU can be found.

The invention claimed is:

1. An apparatus comprising:
    a table including Internet protocol (IP) addresses and corresponding ports, the ports specifying physical and logical links;
    a router module for receiving IP packets and using the table to associate the IP packets with the ports without differentiating between ports specifying physical links and ports specifying logical non-persistent links; and
    a driver for determining when assets for the logical link have become available, refraining from forwarding associated IP packets to the assets if the assets are not available, and then forwarding the associated IP packets to the assets once the assets have become available, the driver including link management, slot management, and beam steering controllers.

2. The apparatus of claim 1, wherein determining when the assets have become available includes selecting the assets for the logical link.

3. The apparatus of claim 1, wherein the router module also populates the table with ports that are associated with logical links.

4. The apparatus of claim 1, wherein at least one of the ports specifies a logical link that varies spatially.

5. The apparatus of claim 1, further comprising a router interface.

6. The apparatus of claim 5, wherein assets of the router interface include a pool of antenna terminal units; and wherein the driver selects among the antenna terminal units.

7. The apparatus of claim 1, further comprising assets for sending the IP packets to network destinations.

8. The apparatus of claim 7, wherein the assets include an antenna terminal unit.

9. The apparatus of claim 8, wherein the antenna terminal unit includes a phased array antenna.

10. A terminal comprising:
   router interface assets including an antenna terminal unit;
   a router module for receiving incoming Internet protocol (IP) packets and routing the incoming IP packets to a plurality of ports, the router module configured for persistent communication links; and
   a logical link driver including link management, slot management, and beam steering controllers, the logical link driver associated with one of the ports, the logical link driver queuing up those IP packets routed to the associated port, determining which of the assets has become available, and sending the queued packets to the available asset using the antenna terminal unit.

11. The terminal of claim 10, wherein the router module uses a table to route the incoming IP packets, the table including IP addresses and the ports, one of the ports specifying the logical link driver.

12. The terminal of claim 10, wherein at least one of the ports specifies a physical link driver, the router module associating the IP packets with the ports without differentiating between ports specifying physical links and ports specifying logical non-persistent links.

* * * * *